United States Patent
Sukumar (10) Patent No.: US 9,256,751 B2
(45) Date of Patent: Feb. 9, 2016

(54) PUBLIC EXPOSED OBJECTS

(71) Applicant: Sudeep Sukumar, Kerala (IN)

(72) Inventor: Sudeep Sukumar, Kerala (IN)

(73) Assignee: SAP SE, Walldorf (DE)

( * ) Notice: Subject to any disclaimer, the term of this patent is extended or adjusted under 35 U.S.C. 154(b) by 47 days.

(21) Appl. No.: 13/909,430

(22) Filed: Jun. 4, 2013

(65) Prior Publication Data
US 2014/0359792 A1    Dec. 4, 2014

(51) Int. Cl.
*G06F 9/44* (2006.01)
*G06F 15/16* (2006.01)
*G06F 21/62* (2013.01)

(52) U.S. Cl.
CPC ...... *G06F 21/62* (2013.01); *G06F 8/20* (2013.01); *G06F 8/34* (2013.01); *G06F 2221/2111* (2013.01)

(58) Field of Classification Search
CPC ............. G06F 21/62; G06F 8/20; G06F 8/34; G06F 8/70
See application file for complete search history.

(56) References Cited

U.S. PATENT DOCUMENTS

| | | | |
|---|---|---|---|
| 6,985,939 B2 * | 1/2006 | Fletcher | G06F 8/20 707/999.002 |
| 7,051,072 B2 | 5/2006 | Stewart et al. | |
| 7,231,267 B2 * | 6/2007 | Bournas | G06F 8/20 700/104 |
| 7,644,414 B2 * | 1/2010 | Smith | G06F 8/20 709/201 |
| 7,725,354 B2 | 5/2010 | Schwarze et al. | |
| 8,301,627 B2 | 10/2012 | Begue et al. | |
| 8,359,224 B2 | 1/2013 | Simon | |
| 8,433,585 B2 | 4/2013 | Sr et al. | |
| 8,577,991 B2 * | 11/2013 | Rehmann | G06F 8/10 709/217 |
| 8,793,649 B2 * | 7/2014 | Williams | G06F 8/20 717/107 |
| 8,813,028 B2 * | 8/2014 | Farooqi | G06F 8/34 717/107 |
| 8,844,053 B2 * | 9/2014 | Hinton | G06F 21/62 707/999.002 |
| 2003/0182413 A1 | 9/2003 | Allen et al. | |
| 2005/0076327 A1 * | 4/2005 | Helal | G06F 8/20 717/100 |
| 2005/0188010 A1 | 8/2005 | Valk | |
| 2007/0239714 A1 | 10/2007 | Chen et al. | |
| 2008/0157969 A1 * | 7/2008 | Beringer | 340/572.1 |
| 2008/0263035 A1 | 10/2008 | Episale et al. | |
| 2011/0088011 A1 * | 4/2011 | Ouali | G06F 8/10 717/105 |
| 2013/0091149 A1 | 4/2013 | Dunn et al. | |
| 2013/0144880 A1 | 6/2013 | Kemmer et al. | |
| 2013/0219462 A1 * | 8/2013 | Aratsu | G06F 21/10 726/1 |

OTHER PUBLICATIONS

Fang et al., XMLView: Discover domain specific service description in a UDDI compliant registry, 2008, 8 pages.*

(Continued)

*Primary Examiner* — Thuy Dao (74) *Attorney, Agent, or Firm* — Mintz Levin Cohn Ferris Glovsky and Popeo, P.C.

(57) ABSTRACT

A system, a method, and a computer program product for public exposed objects in packaged interfaces of business process applications are provided. A service provider of a service registers a public exposed object for use by a client of the service provider by identifying the public exposed object and associating a predetermined access protocol for accessing the registered public exposed object by the client. The registered public exposed object is accessible from the service provider only. The service provider provides the registered public exposed object to the client during a transaction. The client accesses the registered public exposed object using an identifier, an attribute, an access location of the registered public exposed object, and the predetermined access protocol.

17 Claims, 8 Drawing Sheets

(56) References Cited

OTHER PUBLICATIONS

Sellami et al., An implicit approach for building communities of web service registries, 2011, 8 pages.*

Christian Butzlaff et al;Non-Standard Scenarios for SAP® Supply Network Collaboration;Dec. 28, 2008;213 pages;Galileo Press GmbH 2008;Bonn Boston,US; (https://www.thali.ch/files/Shop/Documents/013146_Leseprobe.pdf).

SAP AG;SAP Business One Product Roadmap;Feb. 2011;28 pages-;SAP AG; Walldorf Germany.(http://www.sapone.co.za/wp-content/uploads/2012/10/SAP-Business-One-Product-Roadmap.pdf?fba85d).

SAP AG;SAP Business Partner (SAP BP);Apr. 2001;39 pages;SAP AG;Walldorf, Germany.(http://help.sap.com/printdocu/core/print46c/en/data/pdf/CABP/CABP.pdf).

SAP SE;Business Partner Data;Jul. 11, 2014;5 pages;SAP SE;Walldorf, Germany. (http://help.sap.com/saphelp_erp60_sp/helpdata/en/be/578be80ec8c944b78438dea24ebeb5/content.htm).

* cited by examiner

FIG. 8

PUBLIC EXPOSED OBJECTS

TECHNICAL FIELD

This disclosure relates generally to data processing and, in particular, to public exposed objects in packaged interfaces of business process applications.

BACKGROUND

Computing systems typically include a plurality of computers communicating via a computer network. The communication among computers can involve exchange of various information, data, instructions, commands, code and/or any other information. The computers can be interacting with one another to achieve some goal. An example of the computer network can be a World Wide Web.

The communication in the computer network can be governed by a particular software architecture. In case of the World Wide Web, such architecture can include Representational State Transfer ("REST") Web service design model, Simple Object Access Protocol ("SOAP") model, and/or any other models. REST can govern how the participants, e.g., origin servers, gateways, proxies and clients, of the computer network can behave. Clients can initiate requests to servers. Servers can process requests and return appropriate responses. Requests and responses can be built around a transfer of representations of resources. A resource can be any coherent and meaningful concept that may be addressed. A representation of a resource can be a document that captures the current or intended state of a resource. REST can facilitate a transaction between web servers by allowing loose coupling between different services. SOAP is a protocol specification for exchanging structured information in the implementation of Web Services in computer networks that relies on Extensible Markup Language ("XML") for its message format.

SUMMARY

In some implementations, the current subject matter relates to a computer-implemented method. The method can include registering, by a service provider of at least one service, a public exposed object for use by at least one client of the service provider. The public exposed object can be included in an application and associated with at least one service. The registering can include identifying the public exposed object using at least one identifier, at least one attribute, and an access location for accessing the public exposed object. The registering can also include associating a predetermined access protocol for accessing the registered public exposed object by at least one client. The registered public exposed object can be accessible from the service provider only. The method can also include providing, by the service provider, upon receiving an access request from at least one client, the registered public exposed object to at least one client during at least one transaction. The client can access the registered public exposed object using at least one identifier, at least one attribute, the access location, and the predetermined access protocol. At least one of the registering, the identifying, the associating, and the providing can be performed on at least one processor.

In some implementations, the current subject matter can include one or more of the following optional features. The registering can include generating at least one interface for access by the at least one client and indicating that the registered public exposed object is available for use by the at least one client. The providing can include providing the registered public exposed object available for use by at least one client based on at least one predetermined data model. The predetermined data model can be specific to at least one client. The predetermined data model can be generic to a plurality of clients of the provider.

In some implementations, the providing can include providing data associated with the registered public exposed object to the at least one client during the transaction. The data can be provided in a predetermined format including at least one of the following: a Java Script Object Notation and Extensible Markup Language.

In some implementations, the service can be a generic service available to a plurality of clients of the provider.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

The subject matter disclosed herein may provide public exposed objects in packaged interfaces of an application of a business system. For example, a business process application may provide a generic service including a generic or standard data model that providers of services can implement to provide for data transfer.

In some implementations, business process applications can be designed to provide various functionalities and services to a user. A business process application can be developed during design time and executed during runtime. Development of an application is typically performed by a developer who can utilize a plurality of tools to create various development objects, which can correspond to various runtime objects that can be processed by a system running the business process application during runtime.

When developing an application, the developer typically works with development objects and packages. The development objects can be individual parts of an application and can include at least one of the following: programs, e.g., reports, transactions, function modules, etc.; program components, e.g., events, screens, menus, function modules, etc.; and objects that programs can share, e.g., database fields, field definitions, program messages, etc. Objects can be arranged in a hierarchy, which can allow the developer to easily navigate between objects for editing purposes, for example. A package can be a container for objects that can logically belong together. The system can require that upon creation of new development objects, such objects are assigned to a particular package. In some implementations, all objects in an application can belong to the same single package.

To ensure interoperability of various software applications or platforms, objects and packages associated with such applications/platforms may need to be shared by the applications/platform. However, the conventional systems do not provide for sharing of objects and/or packages. The current subject matter can provide for a common standardized environment and/or format that can allow for sharing of packages, objects, data, and/or any other information that can ensure interoperability of various applications/platforms with which packages and/or objects are associated. The common environment can be based on a common set of attributes associated with the objects/packages and/or common definitions of objects/packages. Such common attributes/definitions can be determined by various industry standards that can govern interoperability of applications/platforms in that particular industry. Hence, when an object/package is created in a particular application/platform, it can be created with the common attributes/definitions so that it can be used by other applications/platforms that can also use these common attributes/definitions.

Figure 1:
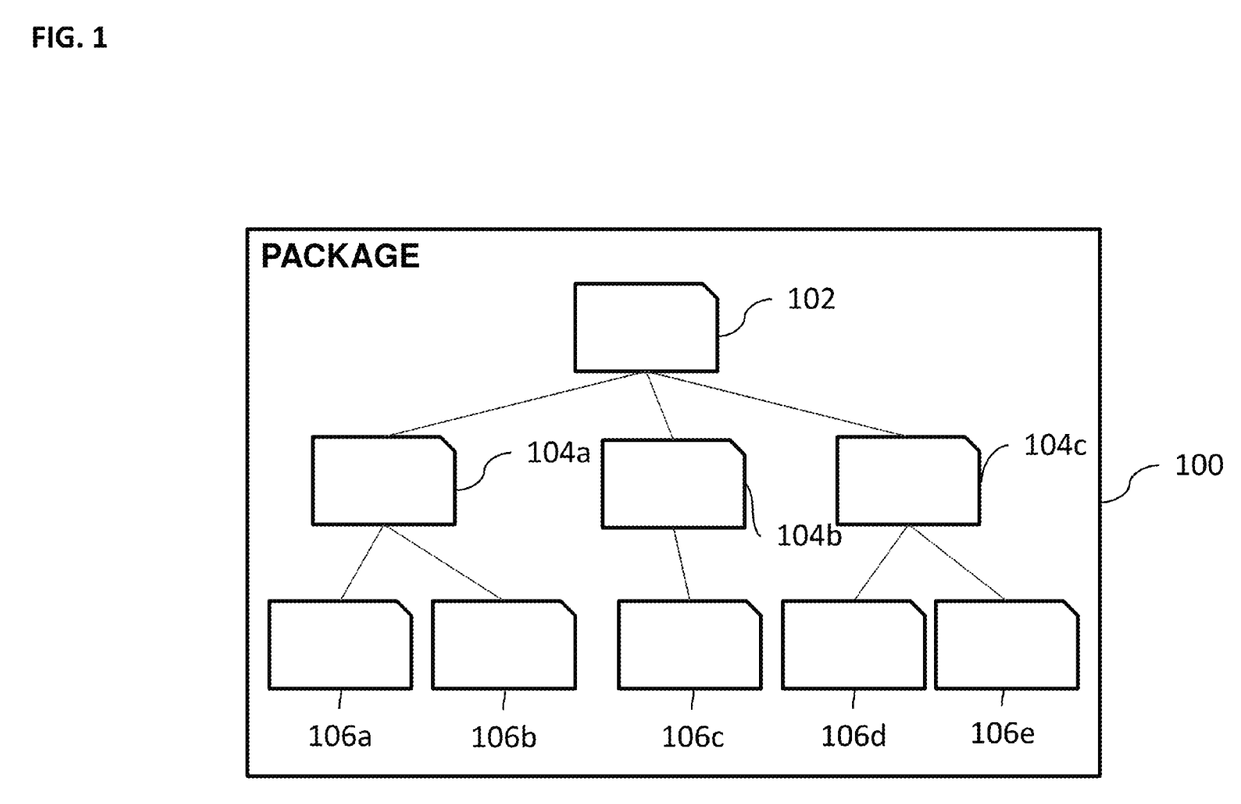
FIG. 1 illustrates an exemplary package and object architecture, according to some implementations of the current subject matter.

FIG. 1 illustrates an exemplary package 100. The package 100 can include a plurality of objects 102, 104(a, b, c), and 106(a, b, c, d, e). As shown in FIG. 1, the objects 102, 104, and 106 can be arranged in a hierarchical model. The object 102 can be at the top of the hierarchical model. Objects 104 can form a second level of the hierarchy and objects 106 can form a third level, which can be based on the second level objects 104. Other ways of arrangement of the objects within the package 100 are possible.

A package can also be a type of development object. An example of a package can be a general ledger accounting. The objects and/or packages can be stored in a database that can be associated with the application and/or system that is designed to execute the application (including runtime versions of its development objects) at runtime.

Packages can have two types: provider or server packages and user or client packages. Provider packages can offer development capabilities and elements to other packages that can use one or more interfaces. The capabilities and elements can include at least one of the following: function modules, business application programming interfaces ("BAPI", such as, those provided by SAP AG, Walldorf, Germany), classes, advanced business application programming ("ABAP", such as, the one provided by SAP AG, Walldorf, Germany) programs, types, etc. A provider can also be a client that can use and/or provide services of other packages.

Figure 2:
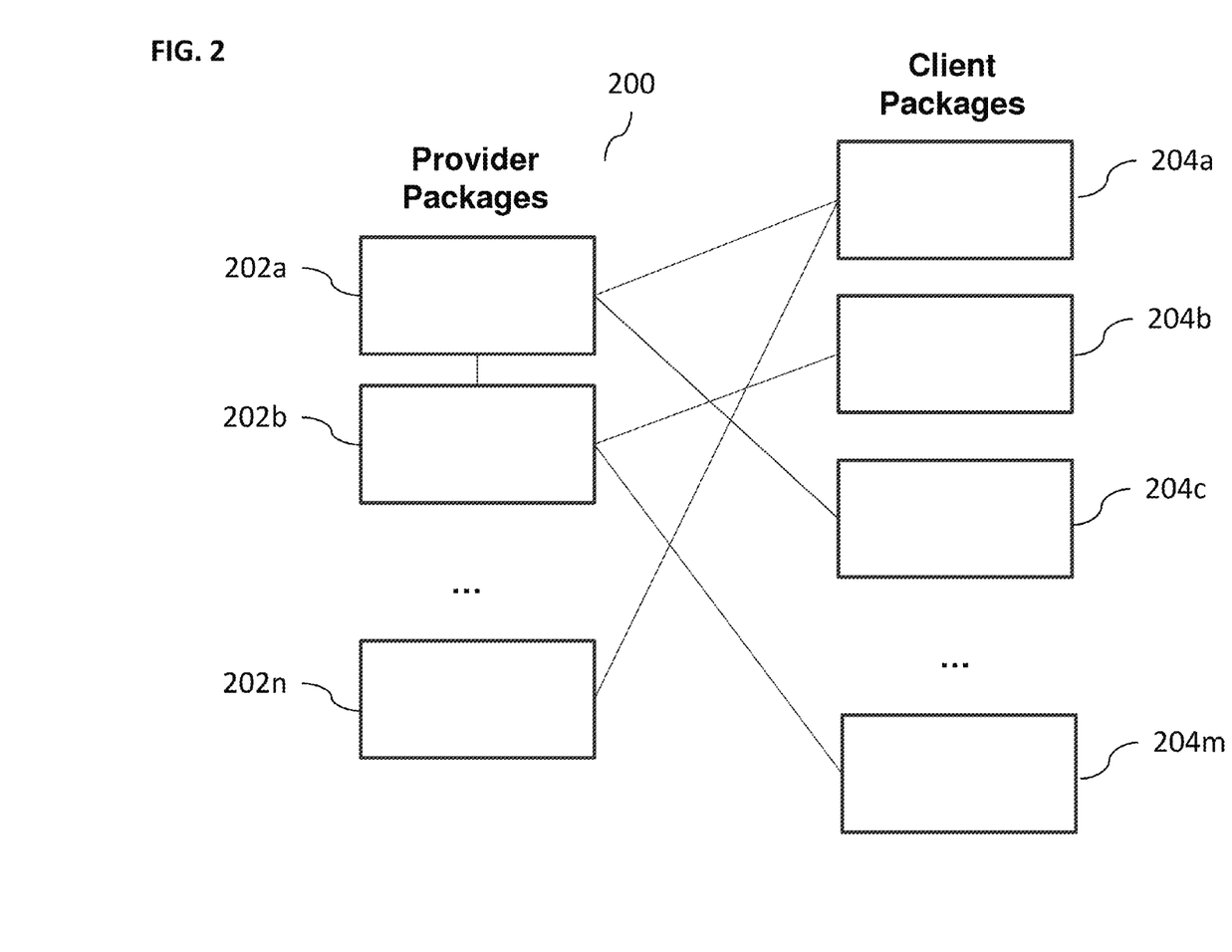
FIG. 2 illustrates exemplary system having a plurality of provider and client packages, according to some implementations of the current subject matter.

FIG. 2 illustrates exemplary system 200 having a plurality of provider and client packages. Packages 202 (a, b, . . . , n) represent provider packages and packages 204(a, b, . . . , m) represent client packages (where n and m are integers). The provider packages 202 can make certain services available to client packages 204 (as indicated by the connecting lines in FIG. 2). Further, some provider packages (i.e., provider package 202a) can provide services to other provider packages 202 (i.e., provider package 202b).

In some implementations, packages can be created using specialized package builder tools. Such tools can allow for at least one of the following: creation of packages and/or sub-packages, specifying a package hierarchy, definition of package interface(s) for a user, addition of element to package interface(s), definition of use access for user packages, restriction of use of interface(s) for selected user(s), creation of structure packages and definition of filter package interface(s), etc.

Tasks that are specific to provider packages can include at least one of the following: creation of packages, definition of package hierarchy, making services available, and/or other tasks. Client packages can be characterized by at least one of the following tasks: creation of packages, definition of package hierarchy, use of services, and/or other tasks.

Creation of packages and definition of package hierarchy can relate to all packages, whether they are provider or user packages. In some implementations, the top level in the package hierarchy can be formed by structure packages. The structure packages can include a plurality of main packages. Any associated sub-packages can be created within each main package. Creation of packages hierarchy can specify number and granularity of sub-packages in each main package, along with the depth to which they are nested within the package. The main package can be a container for development objects that belong together. Several main packages can be grouped together to form a structure package. Once the package is created, properties of the package can be changed. The properties can include at least one of the following: a type of the package (i.e., structure, main or development package), package description, application component, etc.

Package interfaces can also be created to make package elements visible from outside the package. From the outside, a package can look like a "black box." To make package services available to other packages, the package and/or some/all of its services can be made visible to those packages. To make a package visible, package interfaces can be defined. Without an appropriate package interface, the package might not be visible to other packages. Package elements can also be added to the package interface to make them visible (i.e., available for use by other packages).

Figure 3:
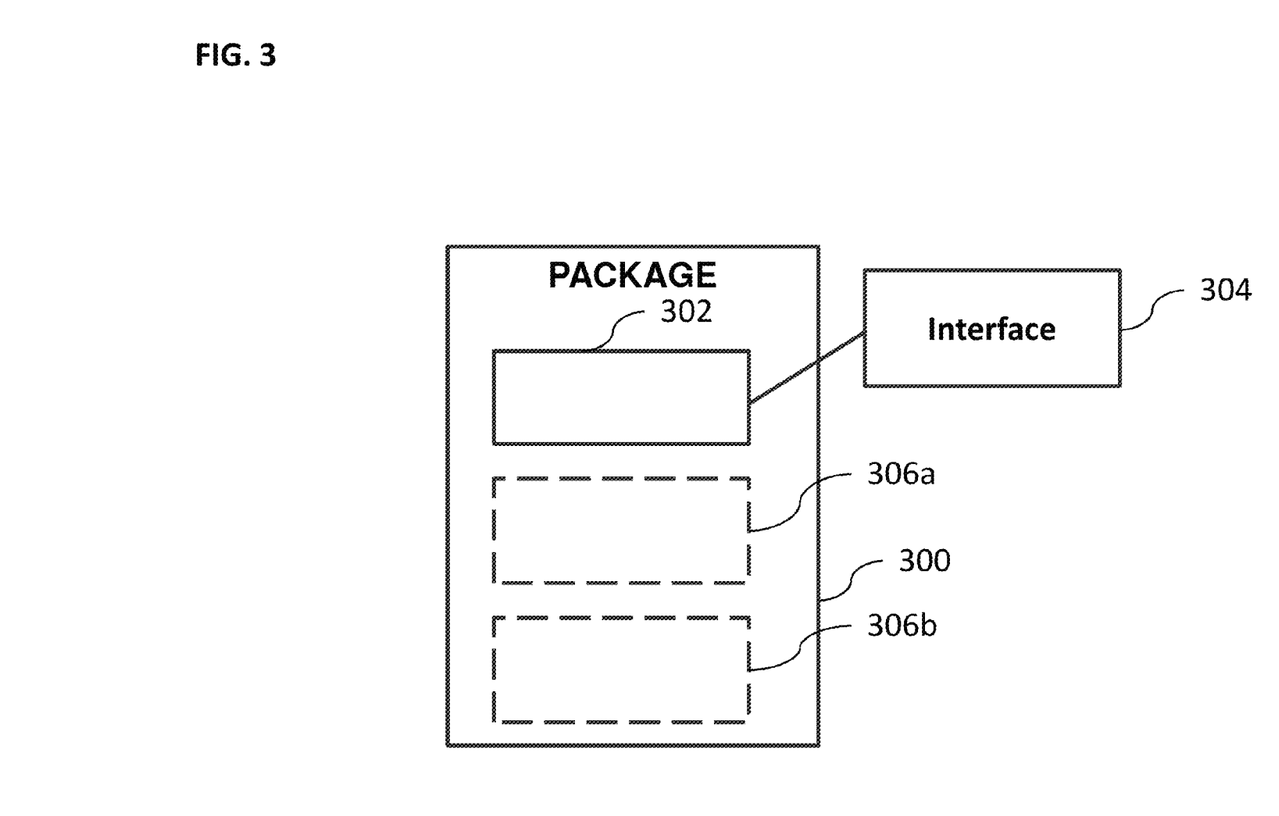
FIG. 3 an exemplary package, according to some implementations of the current subject matter.

FIG. 3 illustrates an exemplary package 300. The package 300 can include a visible service 302 that can include a package interface 304. The package 300 can also include services 306 (a, b) that are not available to client packages or any other packages. Services that are not available cannot be used by other client packages or provider packages. Thus, any functionalities and/or data associated with the services that are not visible cannot be used by such other packages.

In some implementations, exposed objects can be added to the package interface. Development objects that may exist in or be added to the packages might not be visible to objects in other packages and thus, cannot be used by other packages/objects. Thus, to make an object visible to other packages, the object can be exposed in one or more package interfaces.

Such objects can be referred to as exposed objects or visible elements. Objects in other packages can use an object only if it is exposed in one or more package interfaces.

Figure 4:
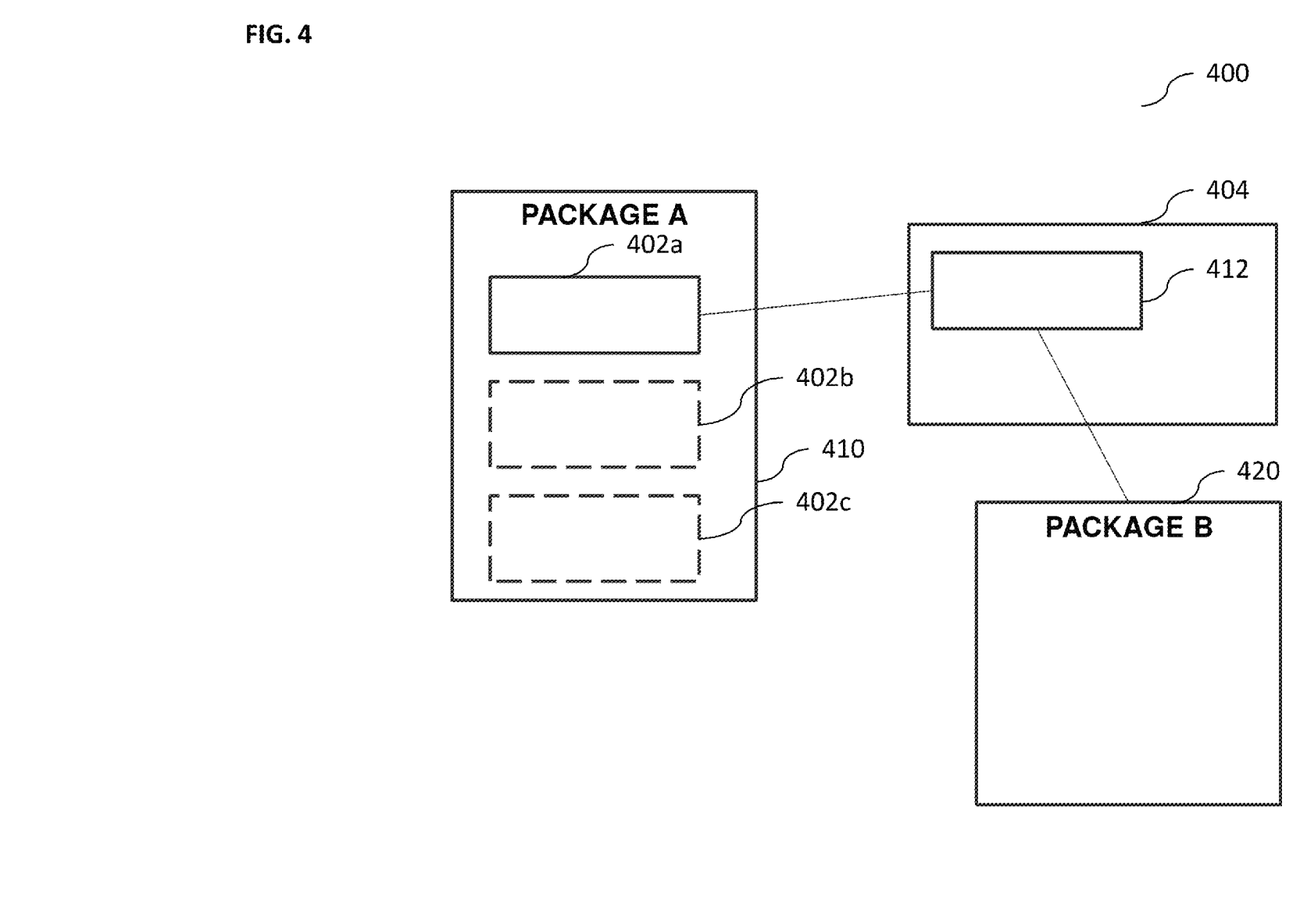
FIG. 4 illustrates an exemplary system that implements use of exposed objects, according to some implementations of the current subject matter.

FIG. 4 illustrates an exemplary system 400 that implements use of exposed objects. The system 400 can include a package A 410 and a package B 420. The package 410 can include a plurality of objects 402 (*a, b, c*). Object 402*a* can be made visible (or exposed) to other packages, including package 420, by exposing it as object 412 in the package interface 404 of the package 410. Objects 402*b* and 402*c* are not visible and thus are not exposed in the package interface 404. As such, the package B 420 can use object 402*a* and cannot use objects 402*b* and 402*c*.

In some implementations, the level of usage of an exposed object by a client package can be determined by the scoped usage types that can be attached to the object in the package interface. A scoped usage type can be a usage type that includes an appropriate indication (e.g., a flag) showing whether or how the package and/or any of its elements can be used. If the indication is set, the client package can be allowed to expose it in its interface, otherwise it can only be allowed to use it. In some implementations, the package can also include an exposed objects list (along with scoped usage types) that can specify which objects are exposed and thus, can be added to the package interface.

In some implementations, an exposed object can refer to a package that is created by a generating application to contain the generated objects. It can be attached to a target package and can access same objects as the target package. Additionally, it can have an access to a generator-specific runtime environment that might not be accessible by the target package. In some implementations, a package interface can contain a list of exposed objects that can be used by client packages. The exposed objects can originate from the same package or from another package interface whose contents can be propagatable throughout the packages. A development object can be visible to other packages if it is exposed in an interface of the package.

The provider packages can also make various services available to the user. To provide the services to the user, the provider package structure can be made available to the user, however, the package interface may or may not be necessarily available. If any interfaces are available, then such interfaces can be used to specify which development objects should be visible to other packages. Elements can also be added to the package interfaces and/or grouped based on various usage criteria. Additionally, constraints on use of the elements and/ or interfaces can be defined.

Creation of packages and definition of package hierarchy by the client packages can be similar to creation of packages and definition of package hierarchy performed by the provider packages. As stated above, the client packages can also be characterized by using the services from other packages.

To use services from other packages, a structure for the client package hierarchy can already be available. To use visible elements from another package assigned to the client package's interface, use access for such elements can be appropriately specified. Creation of such use access can depend on whether elements in the package interface are visible.

In some implementation, the packages, its objects, including exposed objects, along with package interfaces can be used for collaboration and/or data sharing by systems implementing various packages. Some services and/or interfacing data structures associated with packages can be made available by providers based on a particular set of standards. Such standards can be based on a specific data model that can allow easy visualization of the data model across different users and different computing platforms. The data model can allow for transfer (e.g., copy and paste) of objects and associated data from one system to another.

In some implementations, the current subject matter can allow a provider of a service to expose an object as a public exposed object so that it can be visible to other systems. The exposed object can include at least one attribute and/or definition that can be commonly defined by at least one standard in the industry associated with the provider of the service. The attributes can be publicly identified in the standard and/or privately determined. The public exposed object can include a generic service associated with the object. The generic service can retrieve any and/or all of the pubic data of the public exposed object using a standard format (e.g., Java Script Object Notation ("JSON"), Extensible Markup Language ("XML"), and/or any other format). The format can include various fields such as identifier, name, address, and/or any other details. The format can also include target object details that can be used to navigate from the main service provider to the target object.

In some implementations, the public exposed object can be associated with a standardized attribute set that can be based on different public exposed object types. The public exposed object can be used to share data between various collaborating applications and/or systems.

Figure 5:
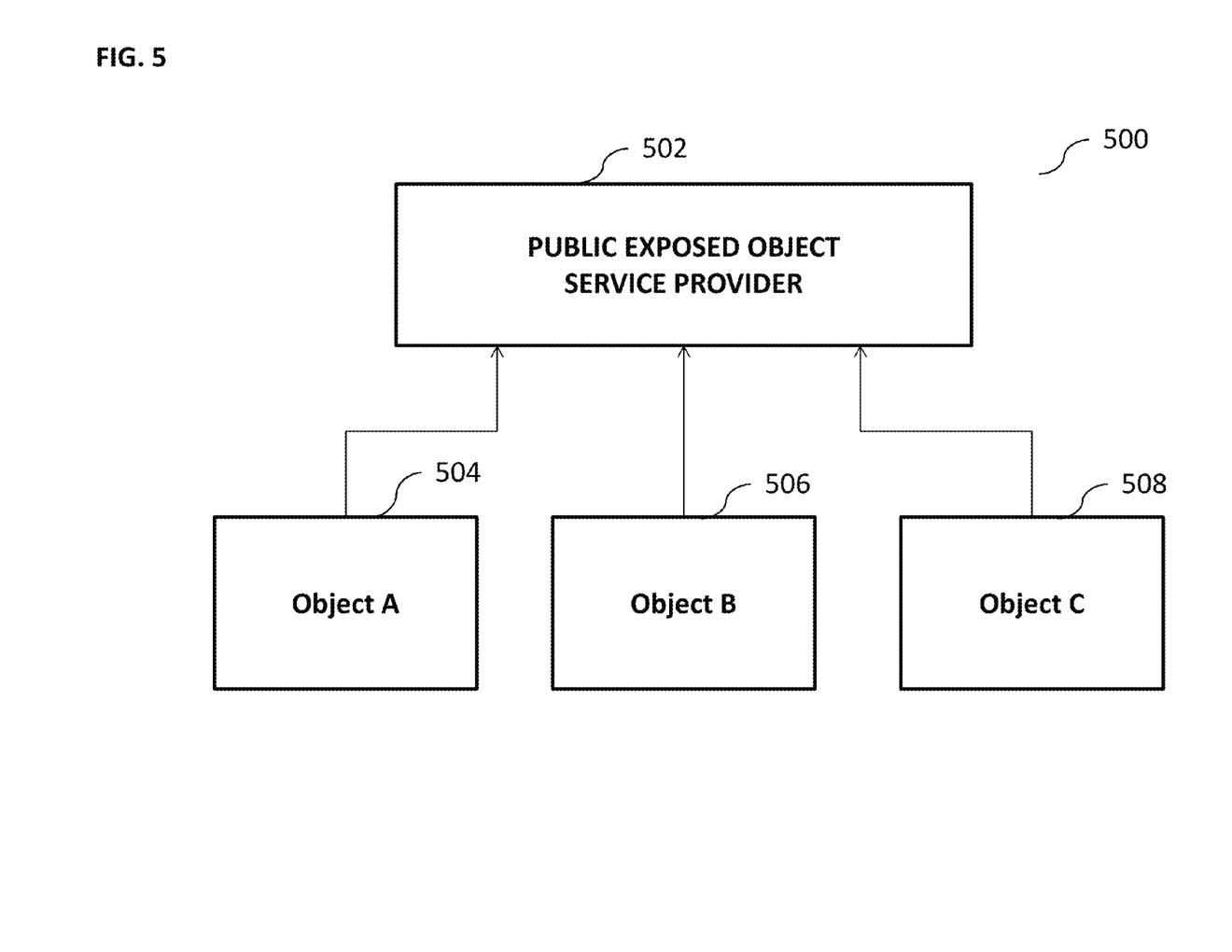
FIG. 5 illustrates an exemplary system that includes a public exposed object service provider and a plurality of registered public exposed objects, according to some implementations of the current subject matter.

In some implementations, in a virtual world, a public exposed object can correspond to a real world object that is unique and that cannot be copied or cloned. A plurality of public exposed objects that can correspond to respective real world objects can register with a public exposed object service provider. FIG. 5 illustrates an exemplary system 500 that includes a public exposed object service provider 502 and a plurality of registered public exposed objects A 504, B 506, and C 508. The objects A, B, and C can correspond to real world or virtual world objects.

Upon registration, the objects can be assigned unique identification information. The information can include a unique identifier, a name, object location information (e.g., where such public exposed object can be found), and various details about the object (e.g., what it is, functionalities associated with the object, data, metadata, etc.). The information can be used to access the public exposed object by a client application during a transaction. The public exposed object service provider 502 (shown in FIG. 5) can store the information about public exposed objects that are registered with the service provider 502. This way objects and/or applications requiring access to a particular public exposed object can access the service provider 502 and obtain such access. In some implementations, the service provider 502 can be the only one that can contain information about registered public exposed objects, where such information is not found anywhere else. This can eliminate duplicate data about public exposed objects being stored at various different locations.

Figure 6:
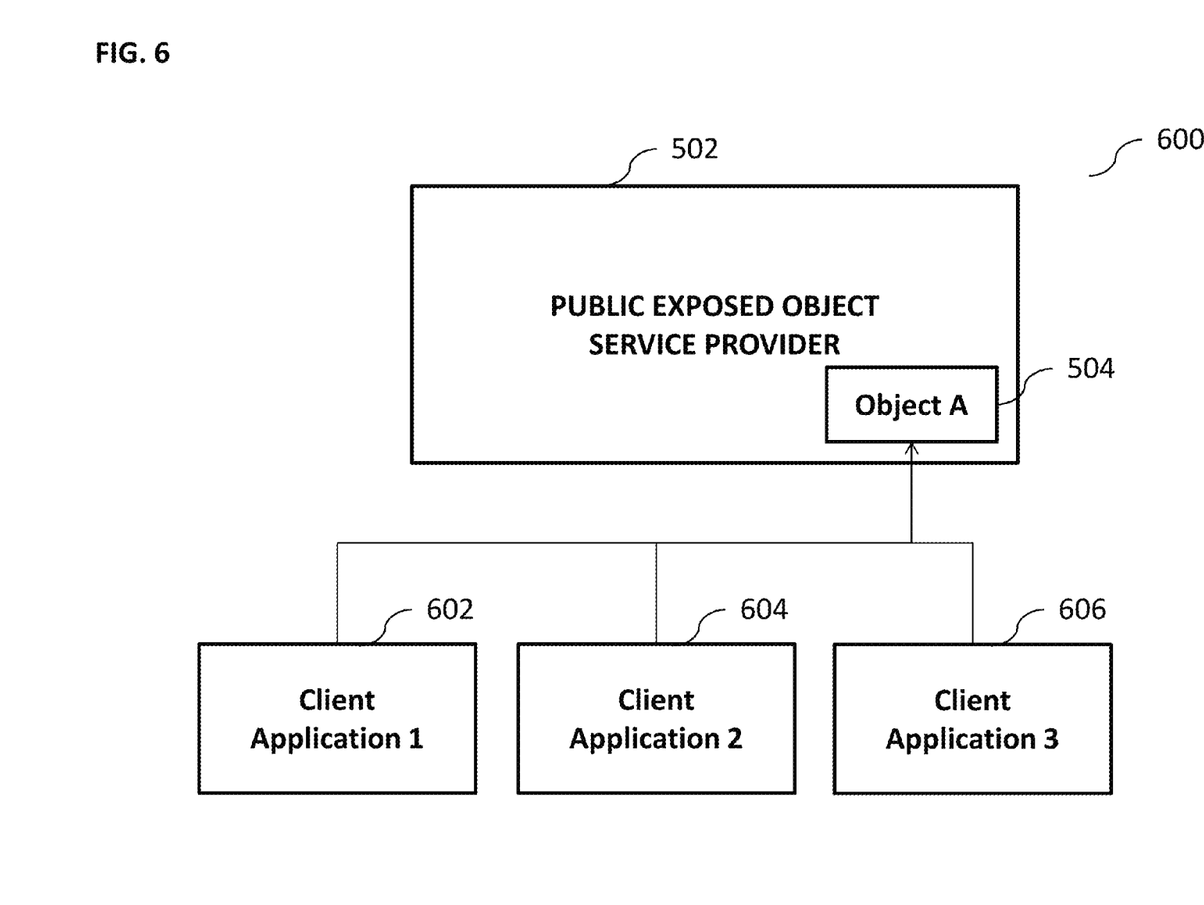
FIG. 6 illustrates a system for providing access to a public exposed object, shown in FIG. 5, registered with the public exposed object service provider, also shown in FIG. 5, according to some implementations of the current subject matter.

FIG. 6 illustrates a system 600 for providing access to a public exposed object A 506 (shown in FIG. 5) registered with the public exposed object service provider 502 (also shown in FIG. 5). The system 600 can include application 1 602, application 2 604, and application 3 606. The applications 1-3 can require access to the public exposed object A 506 during one or more transactions. The applications 1-3 can contact the public exposed object service provider 502 in order to gain access to the public exposed object A 506.

In some implementations, the public exposed object service provider 502 can be a single source of information for public exposed objects that are registered with the service provider 502, thereby eliminating data inconsistency that can be associated with having information about objects stored in different locations. This can eliminate amount of data that needs to be stored in connection with an object. Further, the public exposed object service provider 502 can implement a standard process/protocol for registration of public exposed objects, identification of registered objects, and access to the registered objects by client applications/objects. The standard processes/protocols can be defined based on a particular public exposed object and/or by various industry standards.

In some implementations, the public exposed objects can be registered with the public exposed object service provider based on various data categories, which can determine how the objects registered with the service provider are accessed by external applications/objects. A particular type of application/object desiring access to the public exposed object registered with the service provider can access the public exposed object based on a specific authorization standard (e.g., REST, oAuth, etc.) that can be based on the type of the application.

Figure 7:
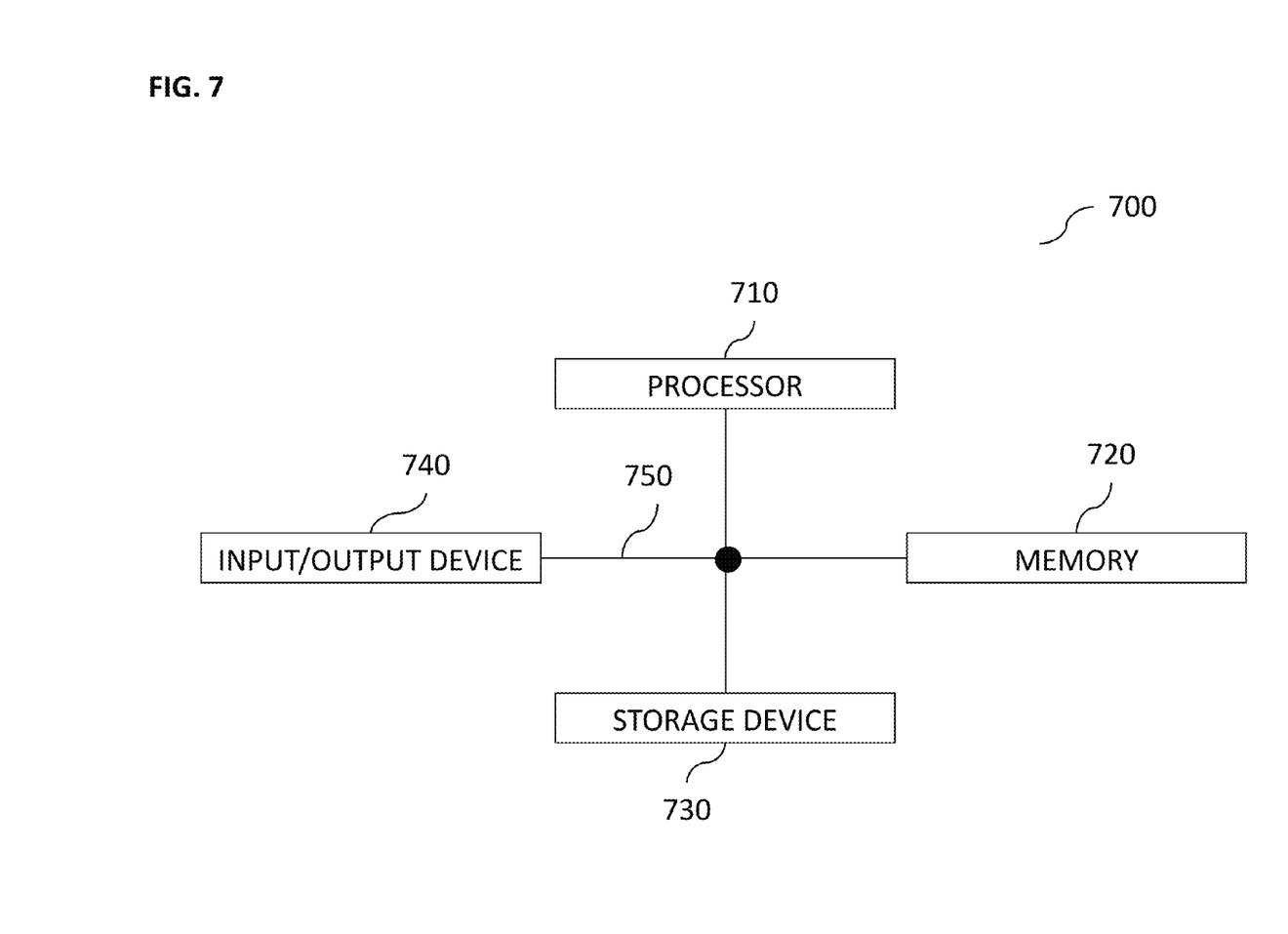
FIG. 7 illustrates an exemplary system, according to some implementations of the current subject matter.

In some implementations, the current subject matter can be configured to be implemented in a system 700, as shown in FIG. 7. The system 700 can include a processor 710, a memory 720, a storage device 730, and an input/output device 740. Each of the components 710, 720, 730 and 740 can be interconnected using a system bus 750. The processor 710 can be configured to process instructions for execution within the system 700. In some implementations, the processor 710 can be a single-threaded processor. In alternate implementations, the processor 710 can be a multi-threaded processor. The processor 710 can be further configured to process instructions stored in the memory 720 or on the storage device 730, including receiving or sending information through the input/output device 740. The memory 720 can store information within the system 700. In some implementations, the memory 720 can be a computer-readable medium. In alternate implementations, the memory 720 can be a volatile memory unit. In yet some implementations, the memory 720 can be a non-volatile memory unit. The storage device 730 can be capable of providing mass storage for the system 700. In some implementations, the storage device 730 can be a computer-readable medium. In alternate implementations, the storage device 730 can be a floppy disk device, a hard disk device, an optical disk device, a tape device, non-volatile solid state memory, or any other type of storage device. The input/output device 740 can be configured to provide input/output operations for the system 700. In some implementations, the input/output device 740 can include a keyboard and/or pointing device. In alternate implementations, the input/output device 740 can include a display unit for displaying graphical user interfaces.

Figure 8:
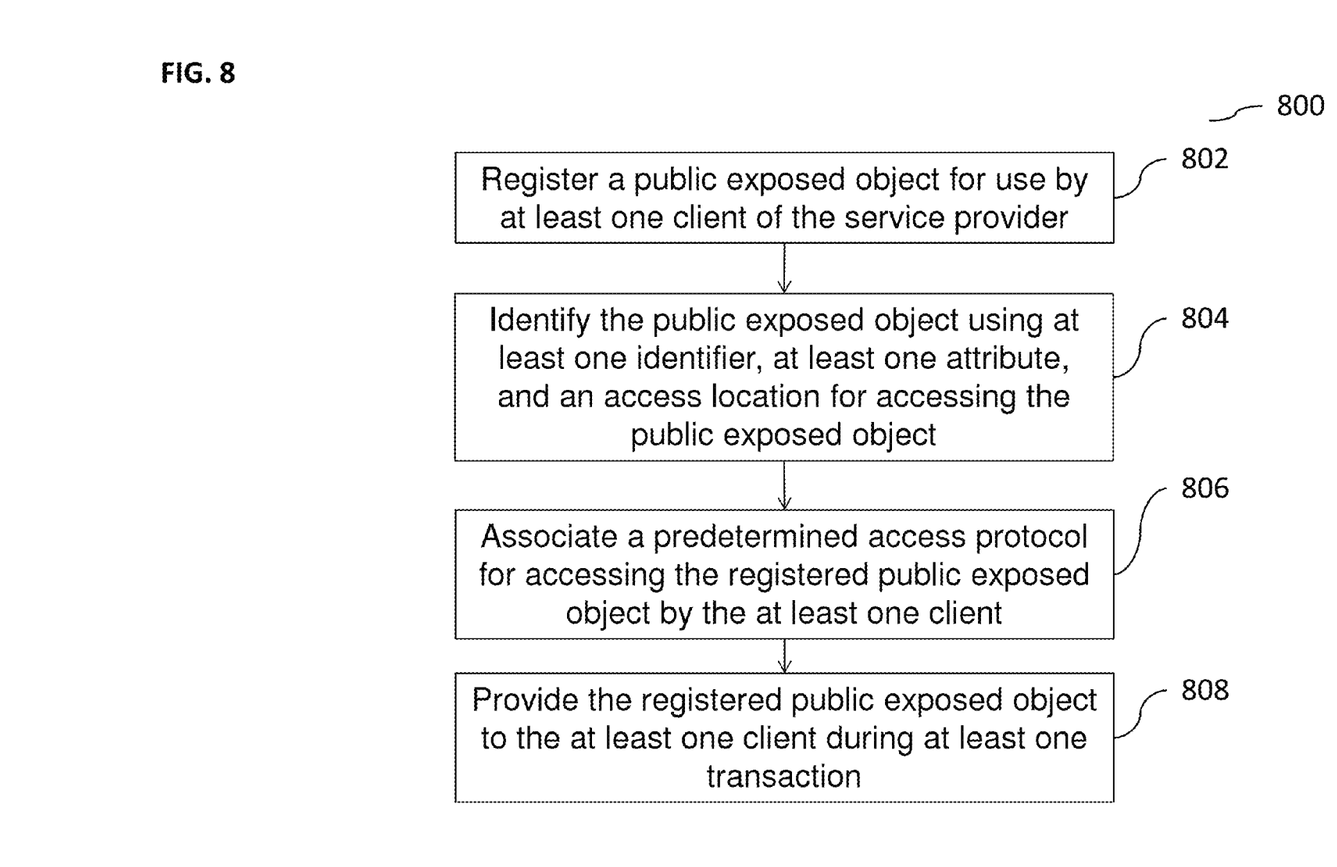
FIG. 8 illustrates an exemplary method, according to some implementations of the current subject matter.

FIG. 8 illustrates an exemplary method 800, according to some implementations of the current subject matter. At 802, a public exposed object can be registered by a service provider of at least one service. The object can be used by at a client of the service provider. The public exposed object can be included in an application and can be further associated with the at least one service. The registration of the public exposed object can include identification of the public exposed object using at least one identifier, at least one attribute, and an access location for accessing the public exposed object (at 804). The identifier can identify the object (e.g., a name of the object). The attribute can describe what the object is (e.g., an accounting report). The access location can represent an access path to the location at the service provider (e.g., an addressable location on a server and/or memory). This information can be generated by the service provider and assigned to the public exposed object. The service provider can also determine an access protocol using which external application can access the registered public exposed object (at 806). The access protocol can be assigned to the public exposed object and external applications can use it for accessing the registered public exposed object. The registered public exposed object is accessible from the service provider only. This means that no other copies of the object exist and if a client application needs to access this object, it will do so through the service provider.

At 808, the service provider, upon receiving an access request from the client, can provide the registered public exposed object to the client during a transaction. The client can access the registered public exposed object using the information that has been assigned to the registered public exposed object, which can include at least one identifier, at least one attribute, the access location, and the predetermined access protocol. At least one of the registering, the identifying, the associating, and the providing can be performed on at least one processor.

In some implementations, the current subject matter can include one or more of the following optional features. Registration of the public exposed object can include generating at least one interface for access by at least one client and indicating that the public exposed object is available for use by at least one client. Providing of the registered public exposed object for use by the client can include providing the registered public exposed object available for use by the client based on at least one predetermined data model. The predetermined data model can be specific to at least one client. The predetermined data model can be generic to a plurality of clients of the provider. The registered public exposed object can be provided to the client along with data that is associated with the registered public exposed object during the transaction. The data can be provided in a predetermined format, which can include at least one of the following: a Java Script Object Notation and Extensible Markup Language. The service can be a generic service available to a plurality of clients of the provider.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:
1. A computer-implemented method, comprising:
registering, by a service provider of at least one service, a public exposed object for use by at least one client of the service provider, the public exposed object being included in an application and associated with the at least one service, wherein the registering includes
identifying the public exposed object using at least one identifier, at least one attribute, and an access location for accessing the public exposed object, and
associating a predetermined access protocol for accessing the registered public exposed object by the at least one client, wherein the registered public exposed object is accessible from the service provider only;
providing, by the service provider, upon receiving an access request from the at least one client, the registered public exposed object to the at least one client during at least one transaction, wherein the at least one client accesses the registered public exposed object using the at least one identifier, the at least one attribute, the access location, and the predetermined access protocol;
determining, by the service provider, an access protocol using which external application can access the registered public exposed object; and
providing, by the service provider, data associated with the registered public exposed object to the at least one client during the transaction, wherein the data is provided in a predetermined format, the predetermined format including at least one of the following: a Java Script Object Notation, Extensible Markup Language, and target object details that can be used to navigate from the main service provider to the target object;
wherein at least one of the registering, the identifying, the associating, and the providing the registered public exposed object, the determining, and the providing data associated with the registered public exposed object is performed on at least one processor.

2. The method according to claim 1, wherein the registering further comprises generating at least one interface for access by the at least one client and indicating that the registered public exposed object is available for use by the at least one client.

3. The method according to claim 1, wherein the providing further comprises providing the registered public exposed object available for use by the at least one client based on at least one predetermined data model.

4. The method according to claim 3, wherein the predetermined data model is specific to the at least one client.

5. The method according to claim 3, wherein the predetermined data model is generic to a plurality of clients of the provider.

6. The method according to claim 1, wherein the service is a generic service available to a plurality of clients of the provider.

7. A computer program product comprising a machine-readable non-transitory medium storing instructions that, when executed by at least one programmable processor, cause the at least one programmable processor to perform operations comprising:
    registering, by a service provider of at least one service, a public exposed object for use by at least one client of the service provider, the public exposed object being included in an application and associated with the at least one service, wherein the registering includes
        identifying the public exposed object using at least one identifier, at least one attribute, and an access location for accessing the public exposed object, and
        associating a predetermined access protocol for accessing the registered public exposed object by the at least one client, wherein the registered public exposed object is accessible from the service provider only;
    providing, by the service provider, upon receiving an access request from the at least one client, the registered public exposed object to the at least one client during at least one transaction, wherein the at least one client accesses the registered public exposed object using the at least one identifier, the at least one attribute, the access location, and the predetermined access protocol, wherein at least one of the registering, the identifying, the associating, and the providing is performed on at least one processor;
    determining, by the service provider, an access protocol using which external application can access the registered public exposed object; and
    providing, by the service provider, data associated with the registered public exposed object to the at least one client during the transaction, wherein the data is provided in a predetermined format, the predetermined format including at least one of the following: a Java Script Object Notation, Extensible Markup Language, and target object details that can be used to navigate from the main service provider to the target object.

8. The computer program product according to claim 7, wherein the registering further comprises generating at least one interface for access by the at least one client and indicating that the registered public exposed object is available for use by the at least one client.

9. The computer program product according to claim 7, wherein the providing further comprises providing the registered public exposed object available for use by the at least one client based on at least one predetermined data model.

10. The computer program product according to claim 9, wherein the predetermined data model is specific to the at least one client.

11. The computer program product according to claim 9, wherein the predetermined data model is generic to a plurality of clients of the provider.

12. The computer program product according to claim 7, wherein the service is a generic service available to a plurality of clients of the provider.

13. A system comprising:
    at least one programmable processor; and
    a machine-readable medium storing instructions that, when executed by the at least one programmable processor, cause the at least one programmable processor to perform operations comprising:
        registering, by a service provider of at least one service, a public exposed object for use by at least one client of the service provider, the public exposed object being included in an application and associated with the at least one service, wherein the registering includes
            identifying the public exposed object using at least one identifier, at least one attribute, and an access location for accessing the public exposed object, and
            associating a predetermined access protocol for accessing the registered public exposed object by the at least one client, wherein the registered public exposed object is accessible from the service provider only;
        providing, by the service provider, upon receiving an access request from the at least one client, the registered public exposed object to the at least one client during at least one transaction, wherein the at least one client accesses the registered public exposed object using the at least one identifier, the at least one attribute, the access location, and the predetermined access protocol, wherein at least one of the registering, the identifying, the associating, and the providing is performed on at least one processor;
        determining, by the service provider, an access protocol using which external application can access the registered public exposed object; and
        providing, by the service provider, data associated with the registered public exposed object to the at least one client during the transaction, wherein the data is provided in a predetermined format, the predetermined format including at least one of the following: a Java Script Object Notation, Extensible Markup Language, and target object details that can be used to navigate from the main service provider to the target object.

14. The system according to claim 13, wherein the registering further comprises generating at least one interface for access by the at least one client and indicating that the registered public exposed object is available for use by the at least one client.

15. The system according to claim 13, wherein the providing further comprises providing the registered public exposed object available for use by the at least one client based on at least one predetermined data model.

16. The system according to claim 15, wherein the predetermined data model is specific to the at least one client.

17. The system according to claim 15, wherein the predetermined data model is generic to a plurality of clients of the provider.

* * * * *